United States Patent Office 2,978,523
Patented Apr. 4, 1961

2,978,523

PRODUCTION OF ALPHA-OLEFINS

Donald M. Coyne, Prairie Village, Kans., and Homer L. Hackett and Ronald L. Poe, Ponca City, Okla., assignors to Continental Oil Company, Ponca City, Okla., a corporation of Delaware No Drawing. Filed Aug. 31, 1959, Ser. No. 836,887

10 Claims. (Cl. 260—683.15)

This invention relates to a method for the preparation of alpha-olefins having a carbon content of at least 3 and more particularly it relates to the production of such olefins from ethylene.

Heretofore, several methods have been proposed for the production of higher olefins from lower olefins. In general, these proposed methods have involved the reaction of a trialkylaluminum compound with a lower loefin, specifically, ethylene to form the so-called growth product. After forming the growth product, it is heated in the presence of an additional quantity of ethylene and a finely divided metal catalyst, such as finely divided nickel. Finally, the higher olefin is recovered from the reaction mass by distillation. The former reaction may be illustrated equationwise as follows:

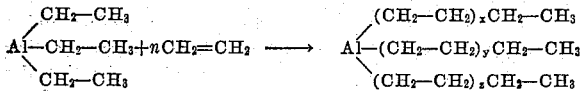

wherein $x$, $y$, and $z$ represent integers ranging from 0–14 (average 3–7) and $x+y+z=n$.

The foregoing reaction may be carried out by passing ethylene through triethylaluminum, preferably in the presence of a diluent under a wide variety of reaction conditions, e.g., 65°–150° C. and 200–5,000 p.s.i.g., preferably 90°–120° C. and 1,000–3,500 p.s.i.g. It is to be understood that instead of employing triethylaluminum as the starting trialkylaluminum in the above reaction other low molecular weight alkyl ($C_2$–$C_4$) aluminum compounds, such as tripropylaluminum, tributylaluminum, triisobutylaluminum, diethylaluminum hydride, ethylaluminum dihydride, etc., may be employed and in lieu of ethylene a slightly higher molecular weight olefin such as propylene and the like may be substituted. Generally $C_2$–$C_4$ olefins are preferred as the growth hydrocarbon compound.

The higher olefins may be produced by heating the growth product in the presence of an additional quantity of ethylene and a catalyst, which process is known as the displacement reaction. This displacement reaction may be illustrated equationwise as follows:

(2)
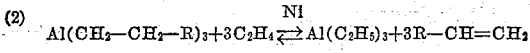

wherein $R=H$, $C_2H_5$, $C_4H_9$, $C_6H_{13}$, etc.

It has been suggested that the alpha-olefins and the triethylaluminum produced according to the foregoing equation can be recovered by fractional distillation. It has been suggested further that, after the separation of the triethylaluminum and the alpha-olefins, the triethylaluminum can be returned to the growth reaction and the alpha-olefins to storage. The actual process, however, is not as simple as equation 2 indicates. This is true, because the triethylaluminum and the alpha-olefins contained in the displacement products tend to undergo a reverse displacement reaction and, for that reason, Equation 2 is written as a reversible reaction. Furthermore, under the conditions present, there is a tendency for the alpha-olefins to isomerize at atmospheric pressure. Our investigations have demonstrated, conclusively, that the reverse displacement reaction and the tendency of the alpha-olefins to isomerize are both accelerated by the catalyst employed in the initial reaction.

It is, therefore, a principal object of the present invention to provide a process for the production of alpha-olefins which obviates the disadvantages of the prior art processes. It is another object of our invention to provide a process whereby alpha-olefins containing at least 3 carbon atoms can be produced from ethylene by a process which is economical and simple to operate. Other objects and advantages of the invention will be apparent as the description proceeds.

To the accomplishment of the foregoing and related ends, this invention comprises the features hereinafter fully described and particularly pointed out in the claims, the following description setting forth in detail certain illustrative embodiments of the invention, these being indicative, however, of but a few of the various ways in which the principle of the invention may be employed.

In brief, the foregoing objects and advantages are attained by a process which may be described as follows: A trialkylaluminum compound is reacted with a low molecular weight olefin, specifically, ethylene to form the so-called growth product, after which the growth product is heated with an additional quantity of the low molecular weight olefin in the presence of a reduction catalyst and an acetylene alcohol.

Before describing the invention in detail, it may be well to disclose the types and quantities of materials suitable for use in the process.

Suitable catalysts include the so-called reduction catalysts, such as nickel, cobalt, palladium, and certain iron compounds. Our preferred catalyst is nickel or a nickel compound, which will react with the trialkylaluminum compound. Our second choice catalyst is cobalt. Specific nickel catalysts include finely divided metallic nickel, Raney nickel, nickel acetylacetonate, nickel naphthanate, etc. Karl Ziegler has designated such catalysts in his work on this subject, broadly as "colloidal" nickel catalysts. The amount of catalyst used can be varied greatly. When the preferred catalyst is employed, the amount used may vary from about 0.001 to 0.1 percent based upon the weight of the growth product present.

Suitable acetylene alcohols are those having the general formula:

$$C_nH_{2n-3}OH$$

including propargyl alcohol, 2-methyl-3-butyn-2-ol, butyne diol, and 1-butyne-1-ol. We prefer propargyl alcohol. The alcohol is very important in the process, as its use inhibits the reverse displacement and isomerization reactions and, as a consequence, makes the process commercially attractive. Conversely stated, when the acetylene alcohol is absent, the process is impractical. The amount of the alcohol can be varied widely and perhaps can be expressed better as based upon the amount of the nickel or other catalyst employed. When nickel is used as the catalyst, we have found that the addition of 300 parts of the alcohol per part of nickel will inhibit the reverse displacement and isomerization reactions indefinitely at room temperature. We have found also that when this amount of the alcohol is used, reverse displacement and isomerization will be inhibited for a period of at least two hours, even when the reaction mass is heated to 100° C. As a practical matter, we have found that considerably less of the acetylene alcohol can be used. For this reason, we generally do not add more than 100 parts of the alcohol per part of nickel. Good results can be obtained even when the amount of the acetylene alcohol used does not exceed 25 to 50 parts per part of nickel. It should be noted that these alcohols do not have any detrimental effect upon the catalyst when the catalyst is used to promote the reaction between the ethylene and the growth product. In other words in our process it acts as a specific poison.

Suitable temperatures employed in the reaction wherein the growth product is heated in the presence of ethylene vary from 50 to 150° C. We prefer to use a somewhat more limited temperature range of 90 to 125° C. The reaction proceeds rapidly and depending on the reaction temperature can take place within less than one minute. Usually due to heat exchange consideration a reaction time from one minute to about 30 minutes is preferred. Longer reaction time can be used however no particular advantages result and undesirable side reactions can occur.

From Equation 2 it will be seen that 3 moles of ethylene per mole of growth product is used. This, however, is the minimum, and as a rule an excess of ethylene is used. Under normal operating conditions, we generally carry out the reaction wherein the process is maintained under an ethylene pressure of 50 to 100 atmospheres.

A further understanding of the present invention will be obtained from the following examples which are intended to be illustrative of the invention but not limitative of the scope thereof.

EXAMPLE 1

Growth product was pumped continuously through an aluminum tube (¾ inch by 7-inch packed with 3/16-inch glass beads). (The growth product analyzed 4.7 percent aluminum with an $m$ value of approximately 4.) The following conditions and flow rates were used:

0.000352 mole of nickel per mole of aluminum (added as nickel acetylacetonate to growth product)
380 ml. of growth product per hour
112° C.
550 p.s.i.g.
3.0 c.f.h. of ethylene A sample of the product coming from the reactor was taken and analyzed by hydrolysis and GLPC; then four 109 ml. (15-minute) samples were collected in four separate flasks. Except for one flask, each flask had 100 parts of an acetylenic compound in it per part of nickel. A portion of the product from each flask was hydrolyzed and analyzed after 24 hours' standing at room temperature. Three days later the samples were heated to 100° for ½ hour and then analyzed. The following table summarizes the results obtained:

*Analysis*

| Sample | 24-Hour Period | | | ½ Hour at 100° C. After Three Days' Standing | | |
|---|---|---|---|---|---|---|
| | Saturated Hydrocarbon[1] | Alpha-Olefin | Beta-Olefin | Saturated Hydrocarbon[1] | Alpha-Olefin | Beta-Olefin |
| Spot (Zero Time) | (5.3) | (86.8) | (8.0) | | | |
| Control | 8.6 | 81.3 | 10.2 | 21.8 | 64.8 | 13.5 |
| Propargyl Alcohol | 5.0 | 86.5 | 8.5 | 4.9 | 86.8 | 8.3 |
| 2-methyl-3-butyn-2-ol | 5.5 | 85.8 | 8.7 | 7.5 | 83.8 | 8.1 |

[1] Saturated hydrocarbons are formed upon hydrolysis of displacement product (from alkyl groups not displaced and from alkyl groups formed by reverse displacement reaction).

By "$m$" value is meant the average number of ethylene units that have reacted with triethylaluminum.

EXAMPLE 2

The procedure of Example 1 was repeated except an equivalent quantity of Raney nickel was substituted for the nickel acetylacetonate used in Example 1. Similar results were obtained.

The substitution of other nickel catalysts listed above for those used in Examples 1 and 2 gave similar results. On the other hand, the substitution of the other reduction catalysts given above gave somewhat inferior results in that a smaller quantity of alpha-olefins was produced.

While particular embodiments of our invention have been described, it will be understood, of course, that the invention is not limited thereto, since many modifications may be made; and it is, therefore, contemplated to cover by the appended claims any such modifications as fall within the true spirit and scope of the invention. As will be apparent to those skilled in the art, our invention is applicable to the production of even-numbered and odd-numbered and straight-chain and branched-chain alpha-olefins. Even-numbered alpha-olefins are produced when triethylaluminum is reacted with ethylene after which the resulting growth product is treated in accordance to our invention. Odd-numbered alpha-olefins are produced when tripropylaluminum is substituted for triethylaluminum in the reaction. It will be obvious to those skilled in the art that the alpha-olefins can be recovered from the other components by other methods in addition to distillation. One other method, by way of example, is solvent extraction.

The invention having thus been described, what is claimed and desired to be secured by Letters Patent is:

1. A process for the preparation of alpha-olefins having a carbon content of at least 3 which comprises reacting a trialkylaluminum compound with ethylene, heating the resultant growth product to a temperature varying from about 50 to 150° C. in the presence of at least 3 moles of ethylene per mole of said growth product, a reduction catalyst, and an acetylene alcohol, and then recovering the alpha-olefins from the reaction mixture.

2. A process for the preparation of alpha-olefins having a carbon content of at least 3 which comprises reacting a trialkylaluminum compound with ethylene, heating the resultant growth product to a temperature varying from about 50 to 150° C. for one to 30 minutes in the presence of at least 3 moles of ethylene per mole of said growth product, a nickel catalyst, and an acetylene alcohol, and then recovering the alpha-olefins from the reaction mixture.

3. A process for the preparation of alpha-olefins having a carbon content of at least 3 which comprises reacting a trialkylaluminum compound with ethylene, heating the resultant growth product to a temperature varying from about 50 to 150° C. for one to 30 minutes in the presence of at least 3 moles of ethylene per mole of said growth product, a Raney nickel catalyst, and an acetylene alcohol, and then recovering the alpha-olefins from the reaction mixture.

4. A process for the preparation of alpha-olefins having a carbon content of at least 3 which comprises reacting a trialkylaluminum compound with ethylene, heating the resultant growth product to a temperature varying from about 50 to 150° C. for one to 30 minutes in the presence of at least 3 moles of ethylene per mole of said growth product, nickel acetylacetonate, and an acetylene alcohol, and then recovering the alpha-olefins from the reaction mixture.

5. A process for the preparation of alpha-olefins having a carbon content of at least 3 which comprises reacting a trialkylaluminum compound with ethylene, heating the resultant growth product to a temperature varying from about 50 to 150° C. for one to 30 minutes in the presence of at least 3 moles of ethylene per mole of said growth product, a cobalt catalyst, and an acetylene alcohol, and then recovering the alpha-olefins from the reaction mixture.

6. A process for the preparation of alpha-olefins having a carbon content of at least 3 which comprises reacting a trialkylaluminum compound with ethylene, heating the resultant growth product to a temperature varying from about 100 to 125° C. for one to 30 minutes in the presence of at least 3 moles of ethylene per mole of said growth product, a nickel catalyst, and an acetylene alcohol, and then recovering the alpha-olefins from the reaction mixture.

7. A process for the preparation of alpha-olefins having a carbon content of at least 3 which comprises reacting a trialkylaluminum compound with ethylene, heating the resultant growth product to a temperature varying from about 50 to 150° C. for one to 30 minutes in the presence of at least 3 moles of ethylene per mole of said growth product, a reduction catalyst, and a propargyl alcohol, and then recovering the alpha-olefins from the reaction mixture.

8. A process for the preparation of alpha-olefins having a carbon content of at least 3 which comprises reacting a trialkylaluminum compound with ethylene, heating the resultant growth product to a temperature varying from about 50 to 150° C. for one to 30 minutes in the presence of at least 3 moles of ethylene per mole of said growth product, a reduction catalyst, and 2-methyl-3-butyne-2-ol, and then recovering the alpha-olefins from the reaction mixture.

9. The process of claim 1 wherein the alpha-olefins are recovered by distillation.

10. The process of claim 1 wherein the alpha-olefins are recovered by extraction.

References Cited in the file of this patent
UNITED STATES PATENTS 2,781,410    Ziegler et al. ---------- Feb. 12, 1957